United States Patent
Smits

(10) Patent No.: US 6,662,271 B2
(45) Date of Patent: Dec. 9, 2003

(54) CACHE ARCHITECTURE WITH REDUNDANT SUB ARRAY

(75) Inventor: Kenneth R. Smits, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 274 days.

(21) Appl. No.: 09/894,638

(22) Filed: Jun. 27, 2001

(65) Prior Publication Data

US 2003/0005225 A1 Jan. 2, 2003

(51) Int. Cl.$^7$ ............................................. G06F 12/08
(52) U.S. Cl. ........................................ 711/118; 711/113
(58) Field of Search ................................. 711/118, 113

(56) References Cited

U.S. PATENT DOCUMENTS

| | | | |
|---|---|---|---|
| 4,725,945 A | * | 2/1988 | Kronstadt et al. .......... 711/106 |
| 5,752,260 A | | 5/1998 | Liu |
| 5,818,785 A | | 10/1998 | Ohshima |
| 5,883,814 A | | 3/1999 | Luk et al. |
| 5,893,151 A | | 4/1999 | Merchant |
| 6,115,795 A | | 9/2000 | Gilda et al. |
| 6,185,146 B1 | | 2/2001 | Shioyama et al. |
| 2002/0138700 A1 | | 9/2002 | Holmberg |

OTHER PUBLICATIONS

Richard C. Murphy and Peter M. Kogge, "Trading Bandwidth for Latency: Managing Continuations Through a Carpet Bag Cache", Proceedings of the International Workshop on Innovative Architecture for Future Generation High–Performance Processors and Systems (IWIA'02), 1527–1366/Feb. 2002 IEEE.

* cited by examiner

Primary Examiner—Mano Padmanabhan
Assistant Examiner—Midys Inoa
(74) Attorney, Agent, or Firm—Blakely, Sokoloff, Taylor & Zafman LLP

(57) ABSTRACT

Architecture for a cache fabricated on a die with a processor including a plurality of cache banks, each containing a plurality of memory cell sub arrays. The sub arrays including a plurality of arrays of memory cells, the arrays including regular arrays and at least one redundant sub array. Logic circuitry is associated with each cache bank. A change in a single bit of the logic circuitry from a first to a second logic state causes one of the regular arrays to become disconnected from the global data bus, and the redundant array to become connected to the global data bus.

21 Claims, 9 Drawing Sheets

CACHE ARCHITECTURE WITH REDUNDANT SUB ARRAY

RELATED APPLICATIONS

This application is related to Ser. No. 09/893,779 filed on Jun. 27, 2001 entitled "ON-DIE CACHE MEMORY WITH REPEATERS" and Ser. No. 09/894,513 filed Jun. 27, 2001, entitled "CACHE ARCHITECTURE FOR PIPELINED OPERATION WITH ON-DIE PROCESSOR", both of which are assigned to the assignee of the present application.

FIELD OF THE INVENTION

The present invention relates generally to the field of very large-scale integrated circuits fabricated on a single semiconductor die or chip. More particularly, the invention relates to the field of high-performance cache memories.

BACKGROUND OF THE INVENTION

Cache memories have been used to maximize processor performance, while maintaining reasonable system costs, for many years. A cache memory is a very fast buffer comprising an array of local storage cells that is used by a processor to hold frequently requested copies of data. A typical cache memory system comprises a hierarchy of memory structures, which usually includes a local (L1), on-chip cache that represents the first level in the hierarchy. A secondary (L2) cache is often associated with the processor for providing an intermediate level of cache memory between the processor and main memory. Main memory, also commonly referred to as system or bulk memory, lies at the bottom (i.e., slowest, largest) level of the memory hierarchy.

In a conventional computer system, a processor is coupled to a system bus that provides access to main memory. An additional backside bus may be utilized to couple the processor to a L2 cache memory. Other system architectures may couple the L2 cache memory to the system bus via its own dedicated bus. Most often, L2 cache memory comprises a static random access memory (SRAM) that includes a data array, a cache directory, and cache management logic. The cache directory usually includes a tag array, tag status bits, and least recently used (LRU) bits. (Each directory entry is called a "tag".) The tag RAM contains the main memory addresses of code and data stored in the data cache RAM plus additional status bits used by the cache management logic. By way of background, U.S. Pat. No. 6,115,795 discloses a computer system comprising a processor that includes second level cache controller logic for use in conjunction with an external second level cache memory.

Recent advances in semiconductor processing technology have made possible the fabrication of large L2 cache memories on the same die as the processor core. As device and circuit features continue to shrink as the technology improves, researchers have begun proposing designs that integrate a very large (e.g., multiple megabytes) third level (L3) cache memory on the same die as the processor core for improved data processing performance. While such a high level of integration is desirable from the standpoint of achieving high-speed performance, there are still difficulties that must be overcome.

Large on-die cache memories are typically subdivided into multiple cache memory banks, which are then coupled to a wide (e.g., 32 bytes, 256 bits wide) data bus. For instance, U.S. Pat. Nos. 5,752,260 and 5,818,785 teach interleaved cache memory devices having a plurality of banks consisting of memory cell arrays. In a very large cache memory comprising multiple banks, one problem that arises is the large RC signal delay associated with the long bus lines when driven at a high clock rate (e.g., 1 GHz). Thus, there is a need for some sort of repeater device to connect each bank of cache memory to the data bus without loss of signal integrity.

One traditional method for sharing a bus is to have each circuit utilize a tri-state driver in order to connect to the bus. Tri-state driver devices are well known in the prior art. A conventional tri-state driver comprises two transistor devices coupled in series to pull the output to either a high or low logic level. The third output state is a high impedance (i.e., inactive) state.

When a tri-state driver is utilized to connect to a bus, the two series-connected output devices of the driver need to be large so as to provide adequate drive strength to the long bus wire. This requirement, however, makes it difficult to use tri-state drivers as repeaters in a multi-megabyte on-die cache memory because the large source/drain diode of the output devices adds considerable load to the bus. The additional load attributable to the tri-state drivers increases bus power and causes significant resistive/capacitive (RC) signal delay. Another drawback of using tri-state drivers as repeaters is the need for decoding circuitry for the drivers. This decoding circuitry is in addition to the decoding circuitry already required for the cache memory banks.

The requirement of sharing the data bus between banks in a large cache memory also creates timing difficulties. The sub arrays within a bank may be placed close enough such that the individual bits of the bus will have about the same timing. However, the cache banks themselves are often located at various physical distances from the receiver or central location on the die that provides a point for information transfer to the processor core. This means that the relative signal timing of data to/from each bank may be very different.

For example, one bank may be located far from the core (or some central location on the die that provides a point for information transfer between the processor and the cache) whereas another bank may be located adjacent to the core. The farther bank would incur a significant signal delay due to the RC nature of the metal lines whereas the nearer bank would not. In other words, some data bits travel a long distance and have a long delay, while other data bits travel a short distance and have a short delay to reach the receiver. At high processor speeds and with very large cache sizes, it can take one or more clock cycles for the bits that are farthest away to arrive at the receiver relative to the bits that are closest. That is, even though data is sent/received synchronously with the clock, the RC delay of the long metal lines prevents the data signals from traversing the distance between a bank and the core in a single clock cycle.

Very large on-die caches also present further difficulties in the implementation of redundant storage elements. In traditional cache designs with redundancy, the redundant array element is read at the same time all the other array elements are read. The selection of which bits are output from the cache is typically controlled through multiplexing. When an array element fails, fuses on the chip are usually blown in order to decode the defective bits out and replace them with the redundant element. The drawback of this approach is that if the cache is very large, the multiplexing problem is huge. For example, if the cache outputs 256 bits, then the redundant element has to have multiplexing connections to be able to feed the data to any one of those 256 bits. Naturally, a huge overhead problem is created by such connections.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

Architecture for a cache fabricated on a die with a processor is described. In the following description, numerous details are set forth, such as specific circuit configurations, logic device types, numerical values, etc., in order to provide a thorough understanding of the invention. It will be clear, however, to one skilled in the art, that these specific details may not be needed to practice the present invention.

In typical cache memory storage arrays that are organized into banks, when one bank is active, it drives a global data bus. All of the bit signal lines of the data bus are usually received at some central location on the die. From there the information is transmitted to the processor core. (In the context of the present application, the term "central location" is intended to have a broad meaning. The term may be construed to include the processor core itself, a receiver device, a set of buffers or latches, or simply a point on the die where the signal lines are coupled to the core. Additionally, the term "central location" is not limited to any particular area, such as the center, of the die; for example, it may refer to a set of connections or points distributed along the periphery of a circuit or region of the core.)

Because of the high frequencies that signals are driven at, and the thinner metal traces that are printed on the die using modern processing techniques, there is a need to repeat or rejuvenate the signal every so often. For example, in state-of-the-art semiconductor processing technology a transmitted signal usually needs to be repeated every 1500 microns or so of metal trace. Without some means of rejuvenating or repeating the signal, the RC delay associated with a long bus line operating at high frequency would result in loss of data.

According to one embodiment of the present invention, each bit of the cache memory bank is connected to a repeater that comprises logic that overcomes the drawbacks associated with the conventional use of tri-state buffers. In one particular implementation, the repeater comprises a single logic gate that drives an inverter. If a bank in the memory is unselected, its output is precharged so that it does not drive the bus. In this manner, when the bank connected to the logic gate is selected, the data stored in the cache array is transmitted through the combinatorial logic structure.

Figure 1:
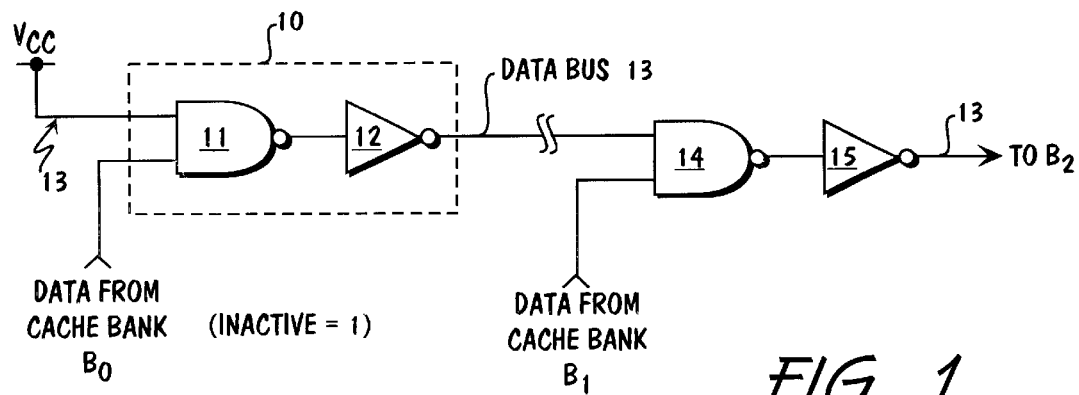
FIG. 1 is a logic diagram of a repeater circuit utilized in one embodiment of the present invention.

With reference to FIG. 1, there is shown a circuit diagram in which repeater 10 is connected in series with data bus 13. Repeater 10 comprises a 2-input NAND gate 11 having an output connected to the input of an inverter 12. One of the inputs of gate 11 is coupled to data bus 13, and the other input is coupled to receive data output from the sub array of an associated cache bank (in this example bank $B_0$). The output of inverter 12 drives data bus 13, which, in this example, is shown connected to another repeater comprising NAND gate 14 and inverter 15, both associated with a corresponding sub array of bank $B_1$.

The use of the repeater structure shown in FIG. 1 implies certain conventions be adopted in the cache memory architecture. One convention is that if the cache bank is unselected (i.e., inactive), the data output from the cache bank is held precharged (high). In the example of FIG. 1, the precharged state is a logical high potential (=1). A logical high potential at one input of NAND gate 11 means that repeater 10 will allow whatever signal is present on data bus 13 to pass through the repeater structure unaltered. That is, data driven from any other cache bank in the memory is unaffected by an inactive cache bank. In this way, repeaters may be concatenated together along a data bus line, with individual repeaters being associated with corresponding sub arrays of each bank of cache memory storage.

Practitioners familiar with the data storage arts will also appreciate that the repeater structure of FIG. 1 obviates the need for additional enable logic or enable pulses. This is made possible, in part, by the convention of precharging the output of the cache bank when the bank is inactive, and also by assigning a default logic value to the data bus itself. Note that in FIG. 1, data bus line 13 is initially coupled to a logical high potential (e.g., $V_{CC}$). In other words, the first segment of data bus 13 that is provided as one of the inputs to NAND gate 11 of the first cache bank ($B_0$) is driven by the positive supply potential of the integrated circuit. Thus, a logical high potential is the default value assigned to the data bus in the cache memory architecture of the embodiment of FIG. 1.

All together, the combinatorial logic gate structure of repeater 10 and the convention of precharging the cache data output and assigning a default logic potential to the bus lines allows data to simply flow from cache bank to processor core, without concern about set-up and hold times. For instance, in the case where the data output from an active cache bank is a logical 1, it is already valid by the existing bus line state. The state of data bus line 13 only changes if the data value output from a given cache bank is a logical 0, in which case there is a propagation delay through all of the repeaters associated with each of the banks before the data on the bus becomes valid.

It should be understood that there is no precharging of the data bus line itself; that is, there is no switching or clocking applied to the data bus. A scheme in which the data bus is switched or clocked periodically would require some sort of dynamic driver design, adding complexity, power, and cost. Instead, the repeater structure of FIG. 1 may be advantageously implemented with simple combinatorial logic.

Another important advantage of the repeater structure shown in FIG. 1 is that the NAND logic gate 11 may be made relatively small, with the inverter 12 made relatively large to drive the next segment of the bus. This circuit construction has the benefit of providing increased speed and reduced power so that no additional repeaters are needed before the bus line reaches the next data bank in the cache memory.

Practitioners in the art will further appreciate that the approach of the present invention also provides another advantage when redundant sub arrays are employed. Each sub array in a block can have its own enable signal that is used to switch the sub array on or off the bus. In this manner, a sub array can be substituted for any other sub array with just the switching of an enable signal, leaving the bus itself unchanged. Hence, the repeater circuit of FIG. 1 permits implementing a redundant sub array scheme without adversely impacting power or speed.

Figure 3:
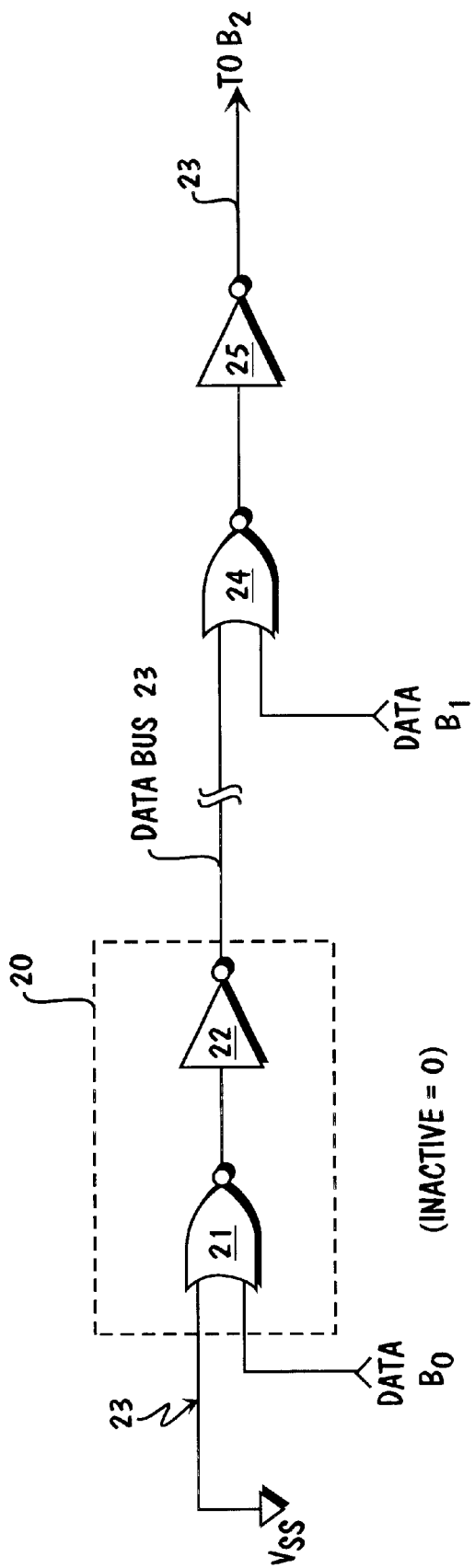
FIG. 3 is a logic diagram of another repeater circuit utilized in a particular embodiment of the present invention.

With reference now to FIG. 3, there is shown an alternative embodiment of a repeater circuit. The embodiment of FIG. 3 is essentially the same as that shown in FIG. 1 except that repeater 20 includes a NOR gate 21 instead of a NAND gate as the input logic device. The output of NOR gate 21 is coupled to inverter 22, which, in turn, drives data bus 23. As can be seen, repeater 20 is associated with cache bank $B_0$, and is concatenated in series on the bus with a second repeater (associated with bank $B_1$) comprising NOR gate 24 and inverter 25.

Instead of being precharged to a logical high potential, the data output from all inactive cache banks are precharged to a logical low potential (=0). Also, the default data bus logic level is a logical 0, e.g., $V_{SS}$. Thus, when the data output from an active bank is logically low, the data on the bus is already valid. The only case in which there is a propagation delay through the repeaters before the data on the bus becomes valid is when a cache bank outputs a logical 1. As discussed in connection with FIG. 1, a cache organization implemented using the repeaters shown in FIG. 3 has the advantage of permitting activation of redundant sub array elements with minimal overhead.

Figure 2:
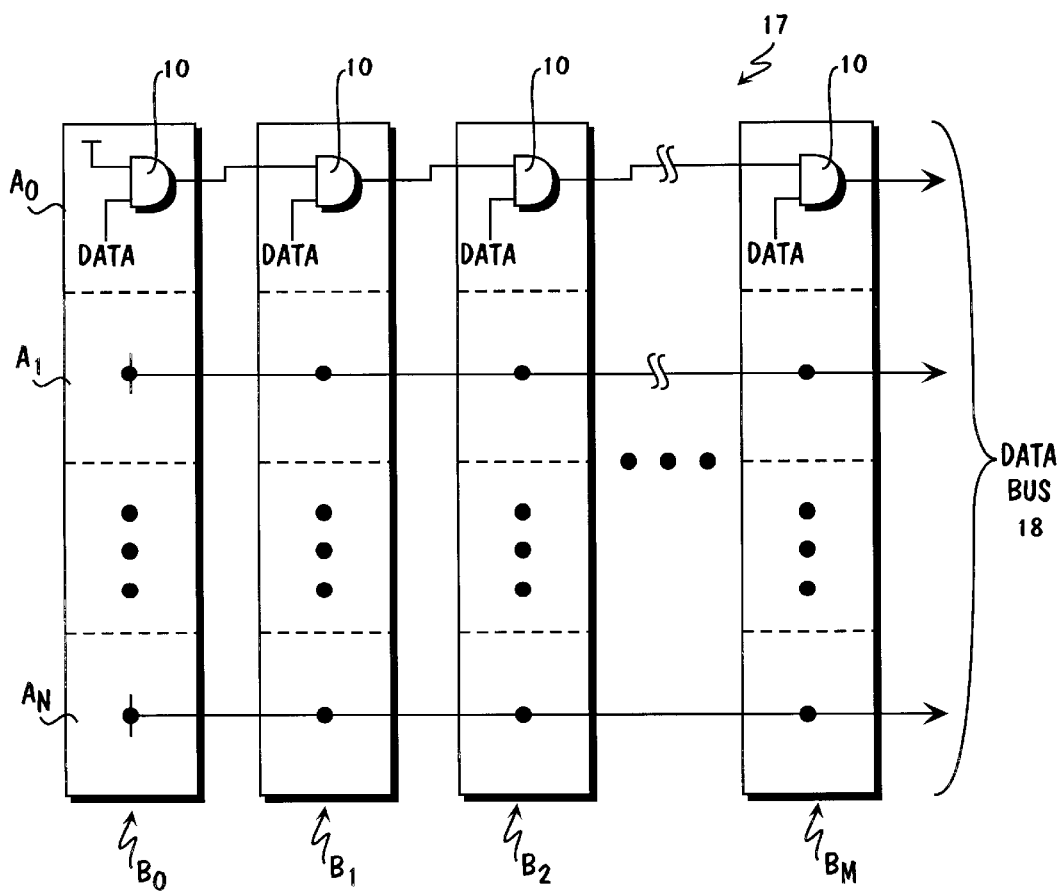
FIG. 2 is a circuit schematic diagram of a cache memory according to one embodiment of the present invention.

FIG. 2 illustrates a cache memory 17 organized into banks ($B_0$–$B_M$) with repeaters associated with corresponding sub arrays ($A_0$–$A_N$) of each bank in accordance to one embodiment of the present invention. By way of example, data from sub array $A_0$ of each bank is selectively connected to one of the lines of bus 18 through repeaters 10. In typical operation, only one of the banks of memory 17 is activated at a time, with the data from the sub arrays of that bank being transmitted onto bus 18 exclusively. For instance, bank $B_2$ may be activated (with remaining banks $B_0$–$B_1$ and $B_3$–$B_M$ inactive) in order to read data stored sub arrays $A_0$–$A_N$ on bus 18.

It should be appreciated that the repeater structure described above allows cache memory 17 to be easily configurable to any size as spaced allows on the die. Moreover, the solution offered by the present invention may be used on any cache memory. For example, current cache memory designs often use the way hit information to decode individual wordlines internal to the sub array. According to the prior art, if the size of the cache memory is changed and the number of ways changes, then the sub array must be redesigned to accommodate the new number of ways. In contrast, according to the present invention, the way hit may be used to select a bank. If the number of ways is changed, the bank is simply added or removed from the die. This approach is much easier and less disruptive to the die floorplan as compared to prior art schemes, and no edits to the sub arrays are required.

Figure 5:
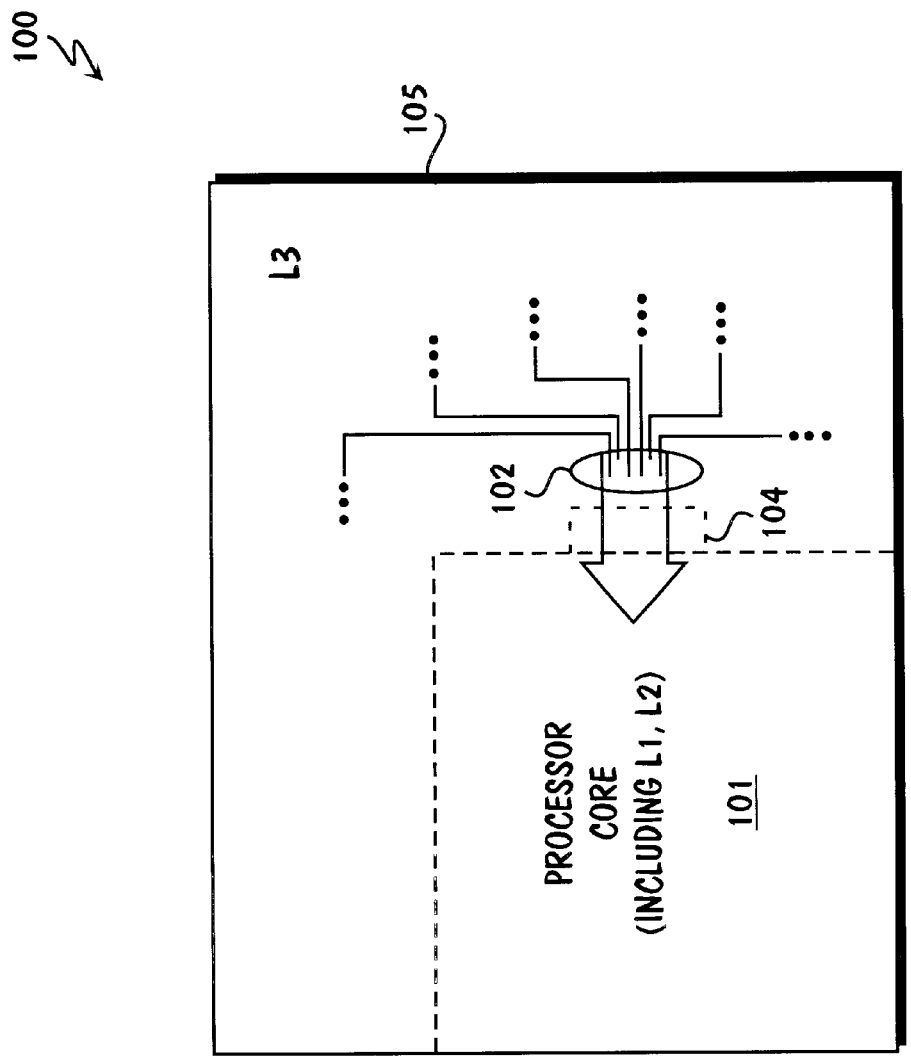
FIG. 5 is an example of a chip floorplan for a processor that includes an on-die L3 cache.

With reference now to FIG. 5, there is shown an example floorplan of a chip 100 having a processor core 101 that includes L1 and L2 caches. Also included on chip 100 is an on-die L3 cache 105. The bus lines 102 coupled to the multiple banks of the L3 cache are received at a central location 104 on the die for communication with the processor core 101. (Although the direction of the arrow shown in FIG. 5 denotes information transfer from the banks to the core, it is appreciated that information is likewise transferred in the opposite direction, i.e., from the core to the cache banks.)

In the example of FIG. 5, some banks of L3 cache memory 105 are located relatively close to central location 104, and other banks are located relatively far from central location 104. As previously discussed data timing and synchronization problems arise in the prior art due to the various distances between the banks and central location 104. To overcome these problems, the cache memory architecture of the present invention sends data synchronously along the bus lines such that it arrives at the receiver (e.g., central location 104) at a predetermined time regardless of which bank the data originated from. This is achieved by inserting flip-flops (i.e., "flops"), buffers or latches along the bus in the data path such that data read from the closest banks passes through the same number of flops, and therefore takes the same number of clocks, as data read from the farthest bank. The same scheme is utilized along the input data path for writing data to the cache banks.

Figure 4:
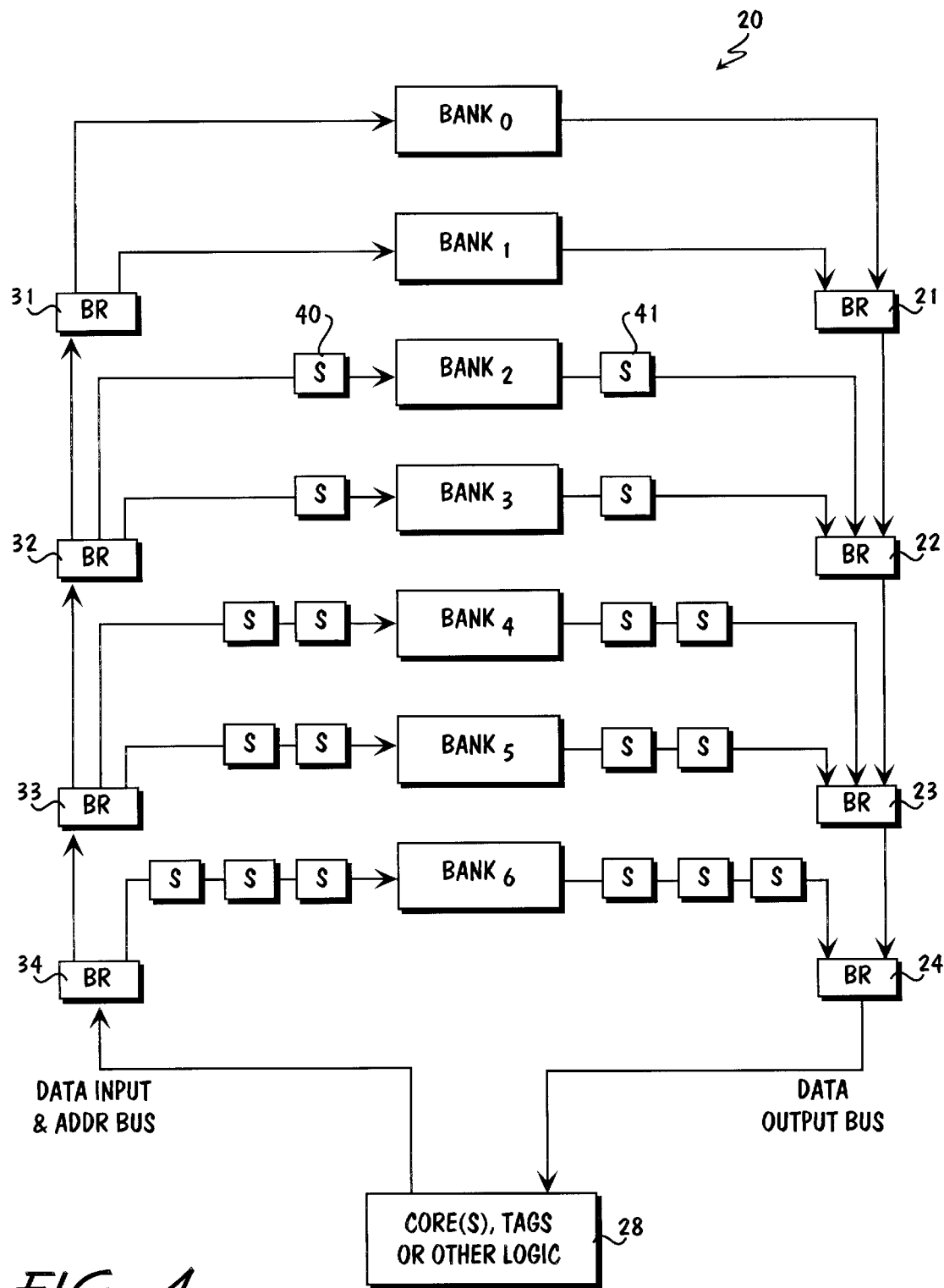
FIG. 4 is a block diagram illustrating one embodiment of the cache architecture of the present invention.

FIG. 4 illustrates an exemplary cache memory 20 organized in accordance with one embodiment of the present invention. Cache memory 20 includes seven cache banks ($Bank_0$–$Bank_6$) each of which is coupled to an input data/address bus and to a data output bus. The input and output buses are both coupled to a block 28, which represents the central location on the chip where information is transferred to/from the processor core. By way of example, block 28 may comprise the tag arrays associated with the cache, the processor core itself, or other logic. Data either originates from or is received by block 28 depending upon the data flow direction.

The spaced-relationship shown between each of the cache banks and block 28 in FIG. 4 is intended to represent the various physical distances that each of the banks are located on the die relative to the central location associated with data transmission from/to the processor core. For example, $Bank_6$ is shown being located closest to block 28, and $Bank_0$ is shown being located farthest from block 28.

The cache memory of FIG. 4 also includes bus repeaters 21–24 inserted in the output data path and bus repeaters 31–34 included in the input data/address path. Each of the bus repeaters is a synchronous device such a clocked flop, buffer, or latch. Bus repeaters are inserted in the data transmission path because a data or address signal can only travel a certain physical or geographic distance along the bus within a given clock cycle. This distance determines the spacing of the bus repeaters along the bus. In other words, bus repeaters are spaced along the bus lines such that a synchronously transmitted signal is received by a next bus repeater (down the line) prior to the next clock cycle. The physical spacing between bus repeaters, therefore, represents the distance a signal can be transmitted on the bus lines in a single clock cycle.

For example, data output from $Bank_0$ must travel the longest distance across the chip and therefore requires the use of bus repeaters 21–24 in order to reach block 28. Stated differently, it takes five clock cycles for signal transmission to/from $Bank_0$. In contrast, $Bank_6$, being the closest bank, only requires the use of bus repeater 24 for output data to reach block 28. To insure that all data arrives and is latched at the central location at a predetermined time regardless of which bank the data is actually stored in, the present invention includes staging devices in the input and output data paths. The blocks labeled "S" (e.g., blocks 40 and 41) in FIG. 4 denote the staging devices. The staging devices may comprise any ordinary synchronous device such a clocked flop, buffer, or latch.

Note that three staging devices are shown inserted in the data path (input and output) coupled to $Bank_6$. In this example, these staging devices are included in order to make the latency associated with $Bank_6$ the same as that associated with the farthest bank, $Bank_0$. By staging data transmission in this manner, synchronization problems inherent in the prior art—such as data accessed from a closer bank colliding on the bus with data from an earlier access to a farther bank—are overcome.

Practitioners in the art will appreciate that the concept of staging provides the further advantage of pipelined data accesses. Because the latency to/from all cache banks is made to be identical in the architecture of the present invention, data accesses can be pipelined, i.e., continuous read and write operations can be performed regardless of which bank the data is actually located. Output data flows back the processor core in the same order it was requested irrespective of the location of the cache bank on the chip where the data is physically stored.

It should be understood that the insertion of the staging devices in the data path for a given bank in the cache is a function of the physical distance of the bank from the central location, and also the operating frequency. For example, more staging devices (and also more bus repeaters) will be needed the faster the operating frequency. Similarly, more staging devices and bus repeaters will be needed the larger the distance between the closest and farthest cache bank.

Whatever the number of staging devices and bus repeaters utilized, the latency or synchronous delay (# of clocks) when accessing any bank in the cache remains constant. In other words, in the cache memory of the present invention a data request to the farthest bank can be immediately followed by a data request to the nearest bank, and the outputs from the respective banks will not collide. The solution of the present invention therefore allows 100% of the bandwidth of the data bus to be utilized. Moreover, it is appreciated that the architecture of the present invention may be used advantageously on non-banked cache memory designs.

Figure 6:
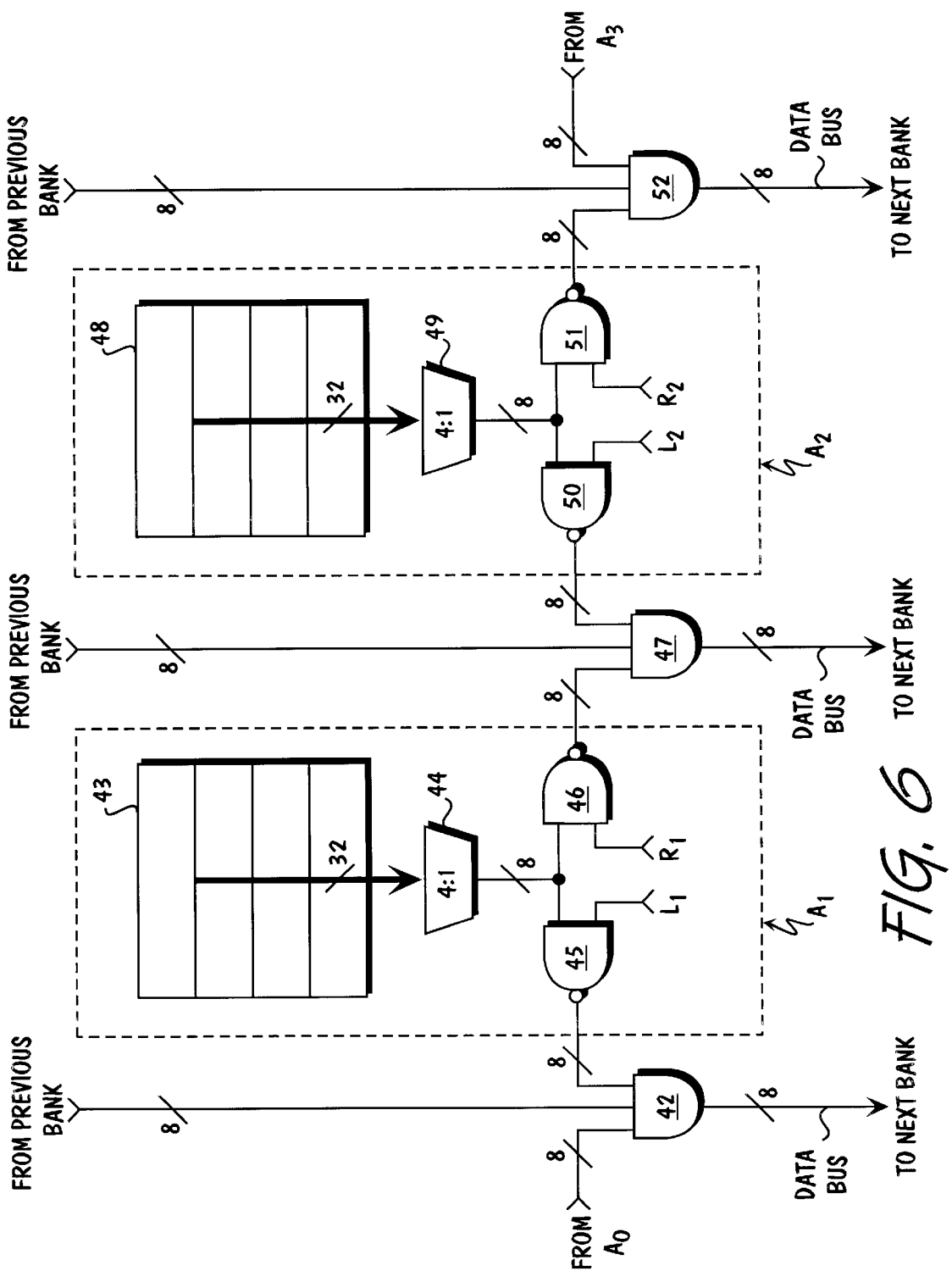
FIG. 6 is an example of sub array busing according to one embodiment of the present invention.

With reference now to FIG. 6, there is shown an example sub array busing for one embodiment of the cache architecture of the present invention. This basic sub array busing is repeated throughout the cache. In the example of FIG. 6, two sub arrays ($A_1$ and $A_2$) of a common bank in the cache are depicted. For purposes of clarity, the word line decoder circuitry is omitted, and only one half of the data storage elements of each sub array are shown in the figure. For example, data arrays 43 and 48 comprise half the storage capacity of sub arrays $A_1$ and $A_2$, respectively. In the particular architecture shown in FIG. 6, four 256-bit chunks of data are read out sequentially. In this example, 32 bits are taken down to 8 bits in each half portion of the sub array by multiplexers 44 and 49, respectively associated with sub arrays $A_1$ and $A_2$.

The data output from each sub array is feed out in either a left or right direction, depending on the state of a pair of enable control lines. For example, in sub array $A_1$ the 8-bit data from array 43 is input to NAND gates 45 and 46. The other input to NAND gate 45 is provided by a left enable control signal line, $L_1$, whereas the second input to NAND gate 46 is coupled to a right enable control signal line, $R_1$. The output of NAND gate 45 is coupled to one input of AND gate 42, and the output of NAND gate 46 is coupled to one input of AND gate 47. AND gates 42 and 47 (and 52) comprise the repeater structure discussed previously (e.g., FIG. 1).

Similarly, in sub array $A_2$, 8-bit data from data storage array 48 is coupled to NAND gates 50 and 51, which also receive $L_2$ and $R_2$ control signals, respectively. Data output from NAND gate 50 is coupled to one input of AND gate 47, with the output of NAND gate 51 being coupled to an input of AND gate 52.

Each of the repeaters 42, 47, and 52 has an input connected to a global data bus line driven from a previous bank, and, in turn, each of repeaters 42, 47, and 52 drives the data output on the line to the next cache bank. The third input to each of the AND gates shown in FIG. 6 is connected to receive data from an adjacent sub array. For instance, AND gate 42 has inputs coupled to receive data from either sub array $A_0$ or $A_1$; AND gate 47 has inputs coupled to receive data from either sub array $A_1$ or $A_2$. Finally, AND gate 52 is connected so as to be able to drive data onto its associated bus line from either sub array $A_2$ or $A_3$.

The state of the enable control single lines determines the direction (left or right) that data flows from a particular sub array. In other words, which global data bus line carries data from which sub array is determined by the L and R signal lines coupled to each sub array. By way of example, if the cache shown in FIG. 6 is configured so that data flows to the right from each sub array, then $L_1$ will be set to a logic low potential, $R_1$ will be set to a logic high potential, $L_2$=low, $R_2$=high, and so on throughout the cache. In this case, data output from $A_0$ is driven on the data bus line associated with repeater 42, data from $A_1$ is driven on the data bus line associated with repeater 47, data originating from $A_2$ is driven on the data bus by repeater 52, and so on.

As will be seen shortly, data flow direction from one or more sub arrays changes when a redundant sub array element is activated to replace a defective sub array within a bank. To disconnect a particular sub array $A_k$ from the bus, both the $L_k$ and $R_k$ signal lines associated with the sub array are driven to a low (i.e., logic "0") potential.

According to the cache architecture of the present invention, at least one redundant sub array element is included in each bank. By including dual NAND gates in data output path of each sub array, data can feed in two alternative directions toward two different bus lines. Each sub array also has its own left and right enable control bits that determine which direction data gets output. The left and right enable bits can be used to switch individual sub arrays on or off the bus. In this way, a sub array can be substituted for any other sub array with just a change in the enable signaling—the global data bus, itself, is unchanged. All of this is achieved with no impact to power or speed. The large number of additional bus lines that characterized prior art cache designs with redundancy is thus obviated by the architecture of the present invention.

Figure 7:
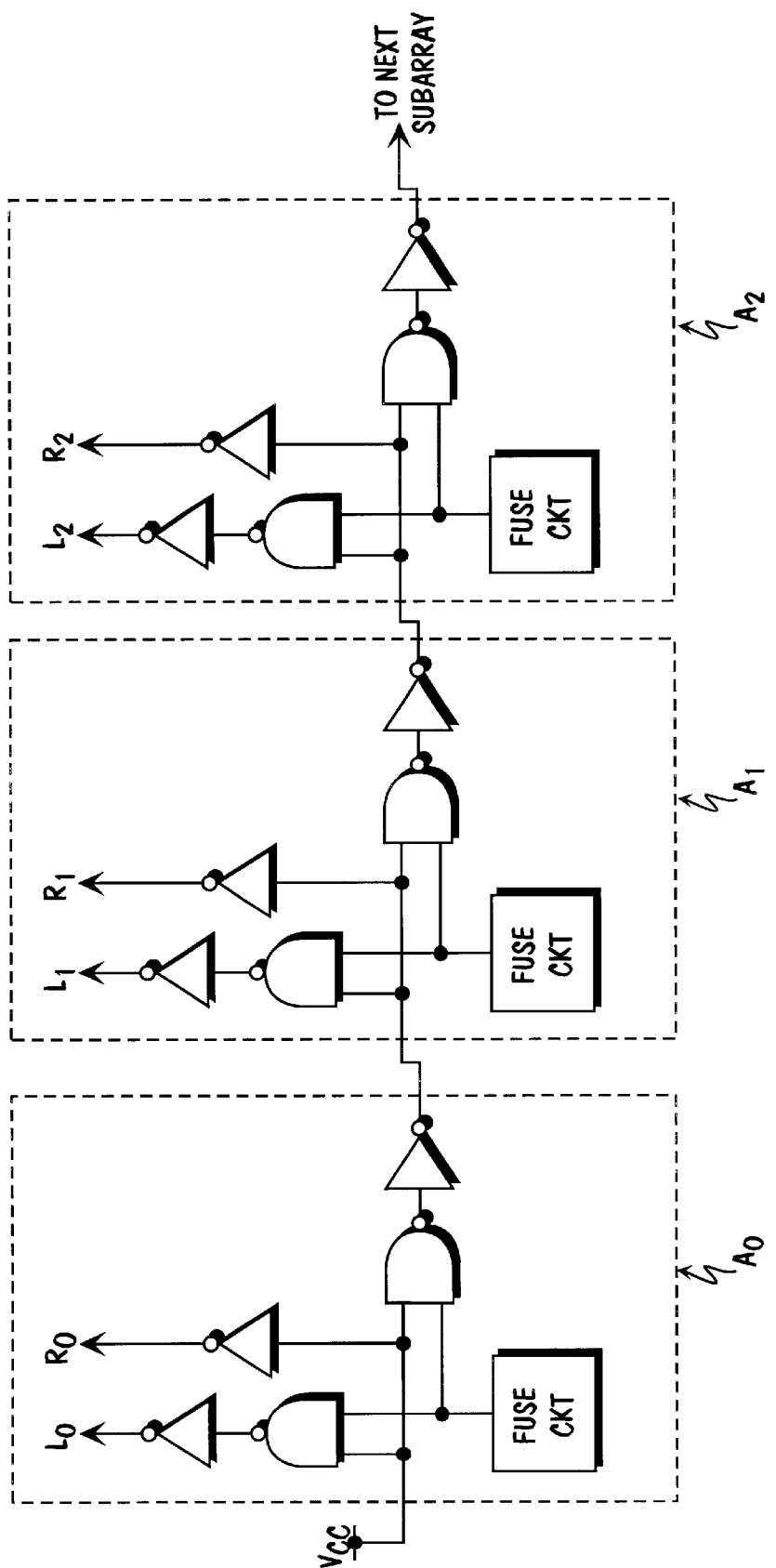
FIG. 7 is a logic diagram of one implementation of a decoding scheme for use with the sub array busing shown in FIG. 6.

FIG. 7 is a schematic diagram illustrating the enable control circuitry utilized in one embodiment of the present invention. As can be seen, the L and R control signal lines of each sub array (e.g., $A_0$, $A_1$, $A_2$, etc.) are driven by the same basic circuit shown enclosed in dashes, which is simply repeated across the cache. In the embodiment shown, a fuse circuit is utilized to selectively disconnect one of the sub arrays from the bank.

Figure 10:
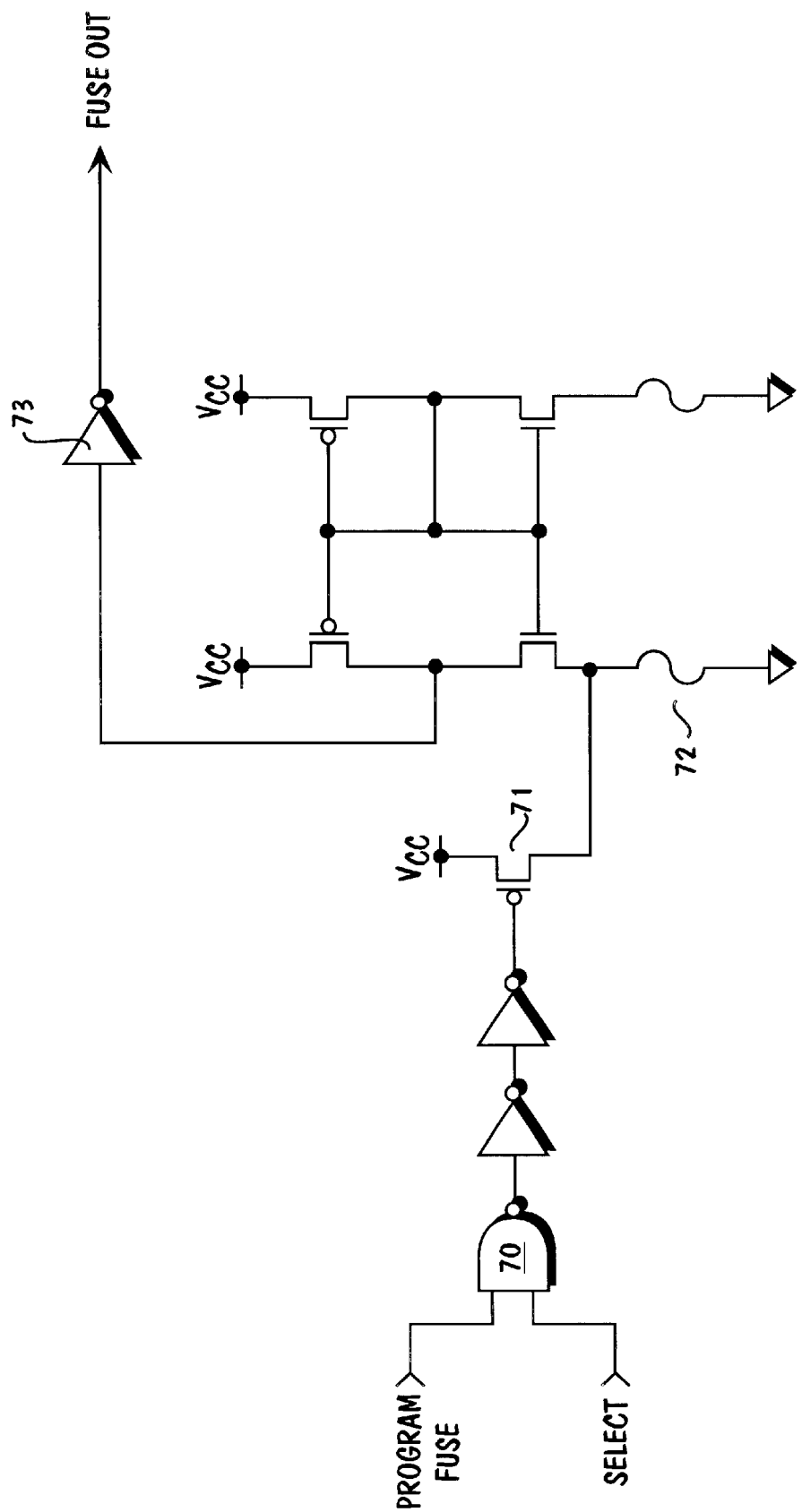
FIG. 10 is a circuit schematic diagram of a fuse circuit for use with the decoding logic shown in FIG. 7.

One possible implementation of the fuse circuit used in FIG. 7 is illustrated in the circuit schematic diagram of FIG. 10. In the circuit of FIG. 10, inverter 73 normally outputs a logic one ("Fuseout") so that each of the $L_i$ and $R_i$ enable control signals comprise a logic one and logic zero, respectively. This condition dictates a state in which all of the sub arrays connect to the left-side data output bus lines. The logic one state at the output of inverter 73 is maintained so long as one or both of the "Program Fuse" and "Select" inputs to NAND gate 70 remain low. The "Program Fuse" line is connected to each of the fuse circuits shown in FIG. 7, with each fuse circuit having its own "Select" signal line. This allows a single fuse circuit associated with a particular sub array to be blown without affecting the other fuse circuits.

To blow a selected one of the fuse circuits, the "Program Fuse" line is raised to a high potential along with the "Select" line associated with the particular sub array to be disconnected. When both inputs to NAND gate 70 are raised to a high potential, the gate of PFET 71 transitions low, which turns on device 71. The current flowing through device 71 is used to blow the fuse 72, causing the output of inverter 73 to flip to a logical zero state. Thus, when the fuse circuit associated with a particular sub array is blown, the L and R enable signals are both set low, which disconnects that sub array from the cache bank.

By way of example, assume that sub array $A_1$ in FIG. 7 is disconnected by selectively blowing its fuse circuit in the manner described above. In this case, sub array $A_0$ is unaffected and still outputs data to the left (i.e., $L_0=1$, $R_0=0$), sub array $A_1$ is disconnected (i.e., $L_0=0$, $R_0=0$). But each of sub arrays $A_{2-N}$ have their enable control states reversed (i.e., $L_0=0$, $R_0=1$), so that all of the sub arrays with a higher index (>1) now output data to the right side bus lines. In other words, in this example every sub array below the defective, disconnected sub array stays on the same bus lines that they were originally connected to. Every sub array above the defective, disconnected sub array is shifted up one bus line to the opposite side (e.g., to the right side).

It is appreciated that the opposite affect can also be achieved. That is, by reversing the L and R outputs in the enable control logic circuitry shown in FIG. 7, disconnecting a particular sub array from the cache will change the bus line connections in a contrary manner; i.e., every sub array above the disconnected array stays on the same bus lines that they were originally connected to, and every sub array below the disconnected array is shifted to the left.

As the following examples demonstrate, the control logic scheme employed in the illustrated embodiment permits substitution of a redundant sub array for any other sub array in the cache bank. This is accomplished simply by blowing a fuse, without the need for extensive bus line multiplexing, and with no adverse impact to power or speed.

Figure 8A:
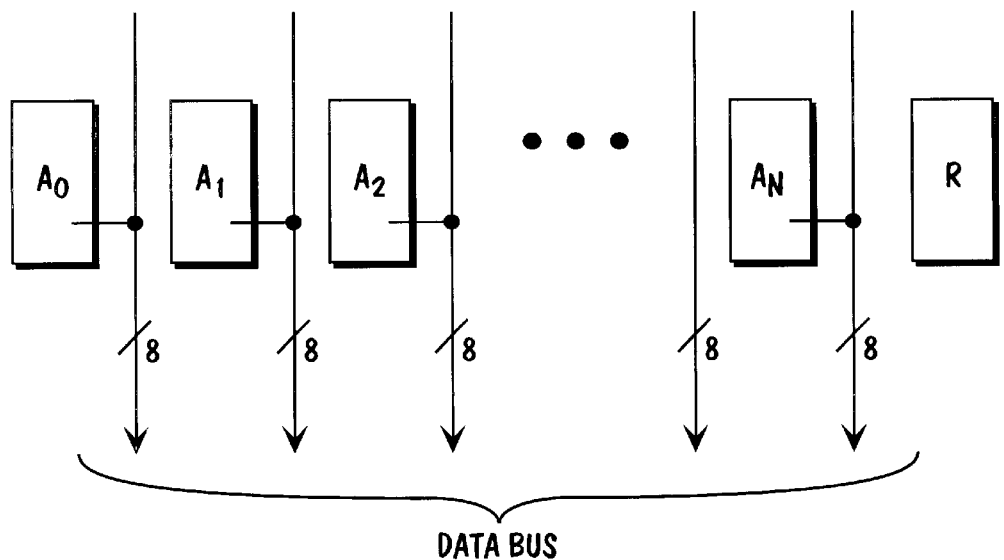
FIGS. 8A & 8B illustrate an example of the use of a redundant sub array according to one embodiment of the present invention.
Figure 8B:
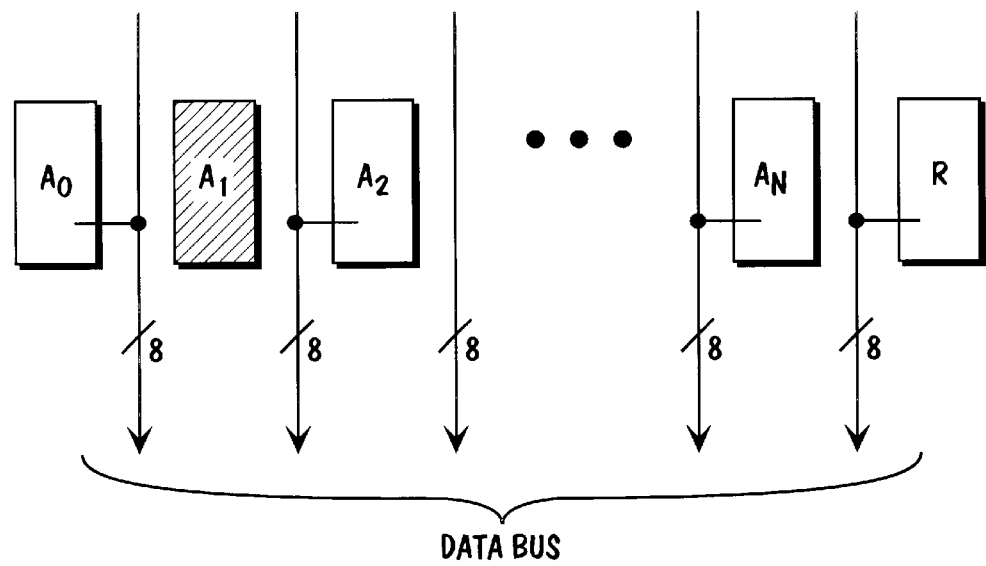

Referring now to FIGS. 8A & 8B, there is shown an example of the use of a redundant sub array in accordance with one embodiment of the present invention. FIG. 8A shows normal sub array decoding in which the redundant sub array (labeled "R") is not used. Each of the sub arrays $A_{0-N}$ is show in an initial state, wherein each is connected to the data bus lines via a right-side connection. FIG. 8B shows the same cache bank after removal of defective sub array $A_1$ and connection to the redundant sub array.

As described above, sub array $A_1$ is removed from the bank by blowing its associated fuse circuit, disconnecting it from the bus. The sub array below sub array $A_1$ (i.e., $A_0$) is unaffected and still has a right-side connection to the data bus. The sub arrays with a higher index, above sub array $A_1$ (i.e., $A_{2-N}$), have their connections reversed; each of the sub arrays $A_{2-N}$ and the redundant sub array "R" is now shown being connected to the data bus through a left-side connection. Importantly, the global bus remains unchanged.

Figure 9A:
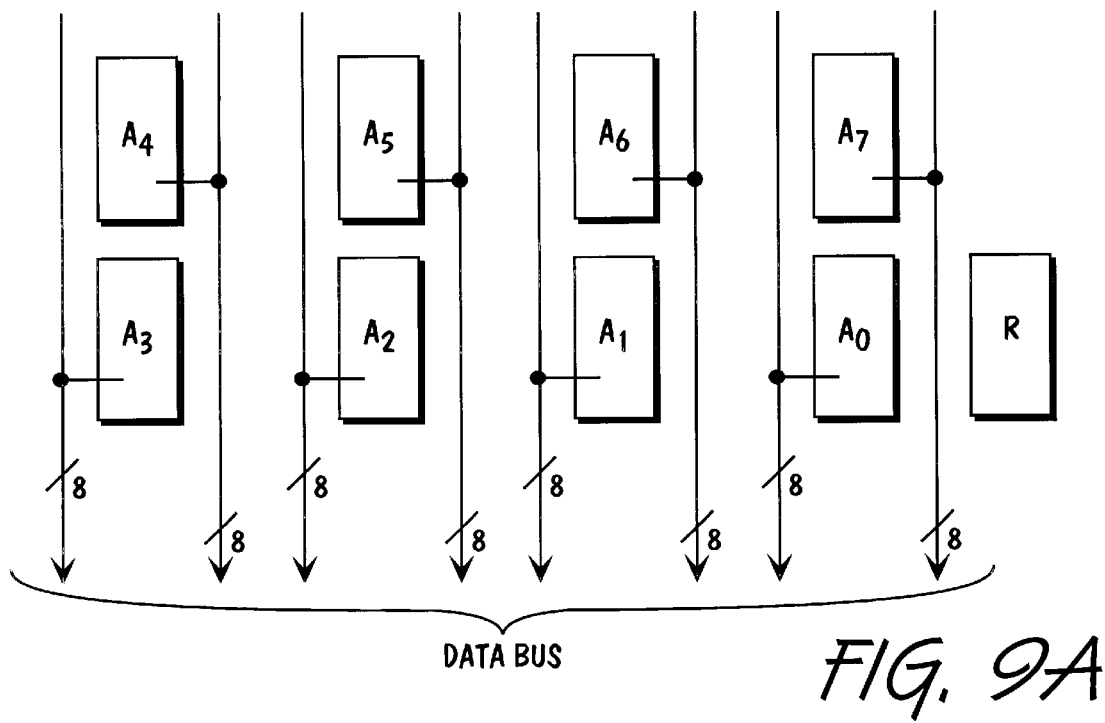
FIGS. 9A & 9B illustrate another example of the use of a redundant sub array according to one embodiment of the present invention.
Figure 9B:
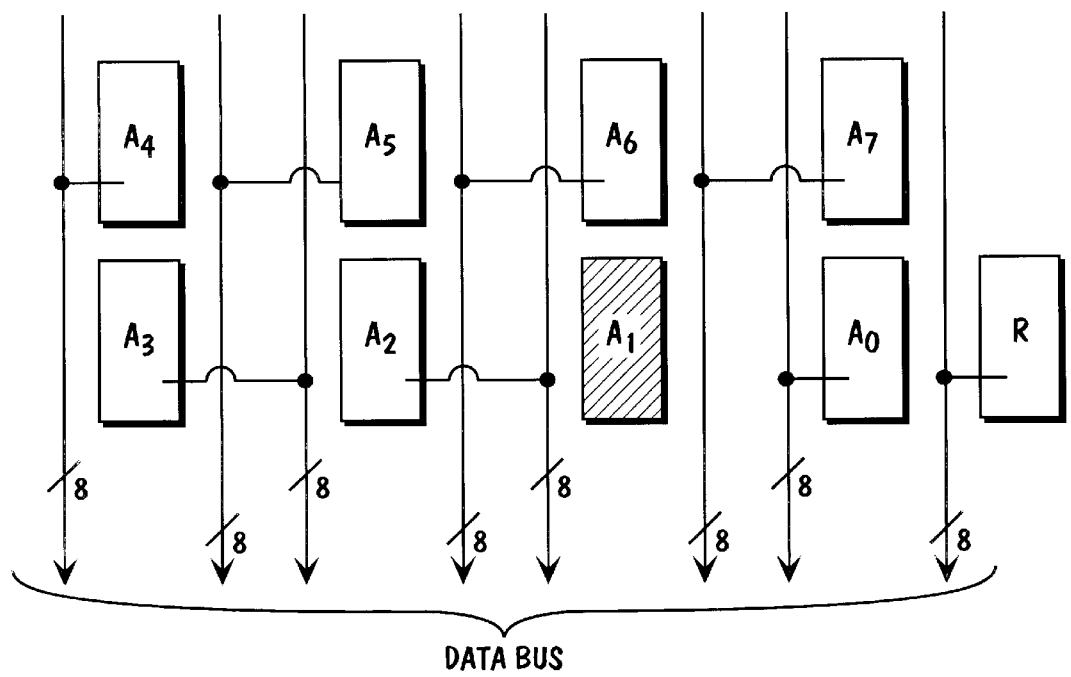

FIGS. 9A & 9B show a further example of an embodiment of the present invention that uses a redundant sub array in a non-linear array pattern. The 2×4 array pattern consists of two rows of four regular sub arrays. The top row comprises sub arrays $A_{4-7}$ and the bottom row comprises sub arrays $A_{0-3}$, arranged as shown. An additional, redundant sub array element is included in the cache bank. In this example, the redundant element is arranged on the bottom row.

FIG. 9A represents a normal sub array decoding situation in which the redundant sub array is not employed. In this case, the rows of regular sub arrays connect to the data bus lines in an alternate fashion; the top row sub arrays $A_{4-7}$ being connected to the right-side bus lines, and the bottom row sub arrays $A_{0-3}$ being connected to the left-side bus lines.

FIG. 9B shows the same cache bank after disconnection of defective sub array $A_1$, and use of the redundant element "R". As was the case in the previous example, disconnection sub array $A_1$ does not affect the bus connection of the lower index sub array; that is, sub array $A_0$ remains connected to the left-side data bus lines. The higher index sub arrays, however, have their connections reversed as a consequence of removal of the defective sub array $A_1$. As can be seen, each of the sub arrays $A_{2-7}$ is now shown being connected to the opposite side bus lines. For instance, sub arrays $A_{2-3}$, which previously were connected to the left-side bus lines, are now shown being connected to the right-side data bus lines. Likewise, each of the sub arrays $A_{4-7}$, which previously were connected to the right-side bus lines, are now shown connected to the bus via the left side. In this example, the redundant sub array "R" is connected to its adjacent bus lines, i.e., the left side. Once again, the global bus remains unchanged after replacement of the defective sub array.

Practitioners in the art will appreciate that the concepts presented in the foregoing examples can be extended to accommodate any grouping or organization of cache arrays. Moreover, the bus lines themselves need not extend along left and right sides adjacent to the sub arrays in the manner shown in the drawings. In addition, ordinary logic circuits other than the specific type shown in the examples of the illustrated embodiments may be used. Alternatively, the changing of the bit setting may be implemented in software or firmware under the control of the computer's operating system. Accordingly, the specification and drawings are to be regarded in an illustrative rather than a restrictive sense.

I claim:

1. A cache comprising:
   a plurality of arrays of memory cells, the arrays being arranged in banks, each bank including regular arrays and a redundant array;

a bus having sets of data lines for connection to the arrays, wherein each bank comprises N regular arrays and the bus comprises N sets of data lines; and circuitry to connect a regular array to either a first set or a second set of the data lines, or to disconnect the regular array from the bus.

2. The cache of claim 1, wherein the circuitry comprises a bit that, when set to a first logic state, causes the circuitry to disconnect the regular array from the bus.

3. The cache of claim 2 wherein the circuitry is further operative to connect the redundant array to the bus responsive to the bit being set.

4. The cache of claim 1 wherein the circuitry has a normal state in which each of the N regular arrays connect in a first direction to a corresponding one of the N sets of data lines of the bus.

5. The cache of claim 4 wherein the circuitry also has a changed state in which an ith regular array is disconnected from the bus, each of the regular arrays 0 to (i−1) connect to the bus in the first direction, and further wherein each of the regular arrays (i+1) to N, and also the redundant array, connect to the bus in a second direction.

6. The cache of claim 4 wherein the circuitry also has a changed state in which an ith regular array is disconnected from the bus, each of the regular arrays 0 to (i−1) connect to the bus in a second direction, and further wherein each of the regular arrays (i+1) to N, and also the redundant array, connect to the bus in the first direction.

7. The cache of claim 1, wherein the arrays in a bank are arranged linearly.

8. The cache of claim 1, wherein the arrays in a bank are arranged in multiple rows.

9. A cache comprising:

a plurality of arrays of memory cells, the arrays being arranged in banks, each bank including regular arrays and a redundant array;

a bus having sets of data lines for connection to the arrays;

circuitry to connect a regular array to either a first set or a second set of the data lines, or to disconnect the regular array from the bus; and a plurality of repeaters each of which provides for series connection of an array with a data line of the bus.

10. A cache comprising:

a plurality of arrays of memory cells, the arrays being arranged in banks, each bank including regular arrays, $A_{0-N}$, and a redundant array;

a data bus having sets of N sets of bus lines, $B_{0-N}$, for connection to the arrays;

logic associated with each array, the logic being configured with a bit that is set to a first state to connect an ith regular array to an ith set of the bus lines, with the redundant array being disconnected from the data bus;

a change in the bit setting from the first state to a second state causing the regular array, $A_i$, to be disconnected from the data bus and the redundant array to be connected to the data bus, wherein the redundant array is connected to the Nth set of bus lines, $B_N$, responsive to the change in the bit setting to the second state.

11. The cache of claim 10, wherein the arrays in a bank are arranged linearly.

12. The cache of claim 10, wherein the arrays in a bank are arranged in multiple rows.

13. A cache of claim 10, wherein the logic includes a fuse circuit having a fuse, when the fuse is in a first conductivity state, the bit setting corresponding to the first state, and when the fuse is in a second conductivity state, the bit setting corresponding to the changed state.

14. A cache comprising:

a plurality of arrays of memory cells, the arrays being arranged in banks, each bank including regular arrays, $A_{0-N}$, and a redundant array;

a data bus having sets of N sets of bus lines, $B_{0-N}$, for connection to the arrays;

logic associated with each array, the logic being configured with a bit that is set to a first state to connect an ith regular array to an ith set of the bus lines, with the redundant array being disconnected from the data bus; and a change in the bit setting from the first state to a second state causing the regular array, $A_i$, to be disconnected from the data bus and the redundant array to be connected to the data bus, wherein regular arrays, $A_0$ to $A_{(i-1)}$ connect to bus lines $B_0$ to $B_{(i-1)}$, respectively, and regular arrays, $A_{(i+1)}$ to $A_N$ connect to bus lines $B_i$ to $B_{(N-1)}$, respectively, responsive to the change.

15. A cache comprising:

a plurality of arrays of memory cells, the arrays being arranged in banks, each bank including regular arrays, $A_{0-N}$, and a redundant array;

a data bus having sets of N sets of bus lines, $B_{0-N}$, for connection to the arrays;

logic associated with each array, the logic being configured with a bit that is set to a first state to connect an ith regular array to an ith set of the bus lines, with the redundant array being disconnected from the data bus;

a change in the bit setting from the first state to a second state causing the regular array, $A_i$, to be disconnected from the data bus and the redundant array to be connected to the data bus; and a plurality of repeaters each of which provides for series connection of an array with a data line of the bus.

16. A method comprising:

changing a single bit associated with a cache bank from a first to a second logic state, the cache bank comprising a plurality of arrays of memory cells, the arrays including regular arrays, $A_{0-N}$, and a redundant array, the regular arrays being connected to corresponding bus lines, $B_{0-N}$, of a data bus when the single bit is in the first logic state;

disconnecting a regular array, $A_i$, from the data bus data bus responsive to the single bit state being changed to the second logic state;

connecting the redundant array to the data bus responsive to the single bit state being changed to the second logic state, wherein regular arrays, $A_0$ to $A_{(i-1)}$ connect to bus lines $B_0$ to $B_{(i-1)}$, respectively, and regular arrays, $A_{(i+1)}$ to $A_N$ connect to bus lines $B_i$ to $B_{(N-1)}$, respectively, responsive to the single bit state being changed to the second logic state.

17. The method of claim 16 wherein the redundant array connects to bus line $B_N$ of the data bus responsive to the single bit state being changed to the second logic state.

18. The method of claim 16, wherein the data bus is unaffected by the single bit state being changed to the second logic state.

19. The method of claim 16, wherein changing the single bit state comprises blowing a fuse.

20. A method comprising:

changing a single bit associated with a cache bank from a first to a second logic state, the cache bank comprising a plurality of arrays of memory cells, the arrays including regular arrays, $A_{0-N}$, and a redundant array, the regular arrays being connected to corresponding bus lines, $B_{0-N}$, of a data bus when the single bit is in the first logic state;

disconnecting a regular array, $A_i$, from the data bus data bus responsive to the single bit state being changed to the second logic state;

connecting the redundant array to the data bus responsive to the single bit state being changed to the second logic state, wherein regular arrays, $A_0$ to $A_{(i-1)}$ connect to bus lines $B_1$ to $B_{(i)}$, respectively, and regular arrays, $A_{(i+1)}$ to $A_N$ connect to bus lines $B_{(i+1)}$ to $B_N$, respectively, responsive to the single bit state being changed to the second logic state.

21. The method of claim 20 wherein the redundant array connects to bus line $B_0$ of the data bus responsive to the single bit state being changed to the second logic state.

* * * * *